Jan. 6, 1942.  H. E. EDGERTON ET AL  2,269,338
FLASH-PRODUCING SYSTEM
Filed Sept. 27, 1939  2 Sheets-Sheet 1
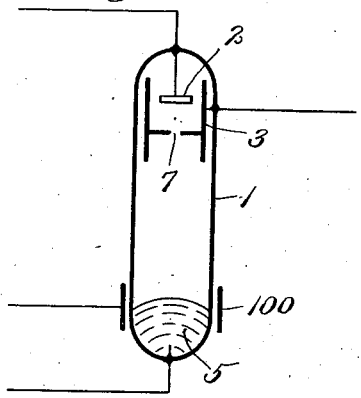
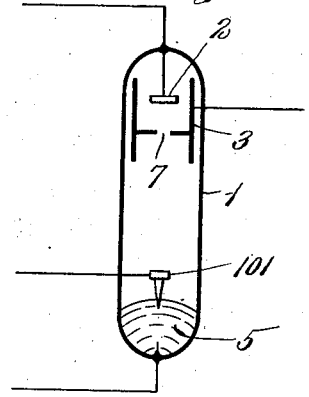
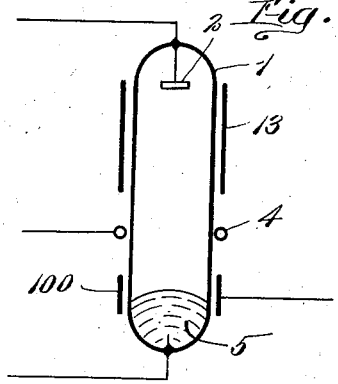
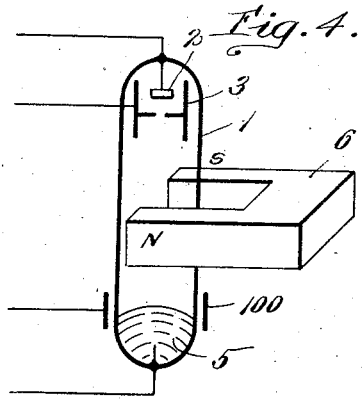
Inventors.
HAROLD E. EDGERTON
KENNETH J. GERMESHAUSEN
by David Rines
Atty.

Jan. 6, 1942.  H. E. EDGERTON ET AL  2,269,338
FLASH-PRODUCING SYSTEM
Filed Sept. 27, 1939  2 Sheets-Sheet 2
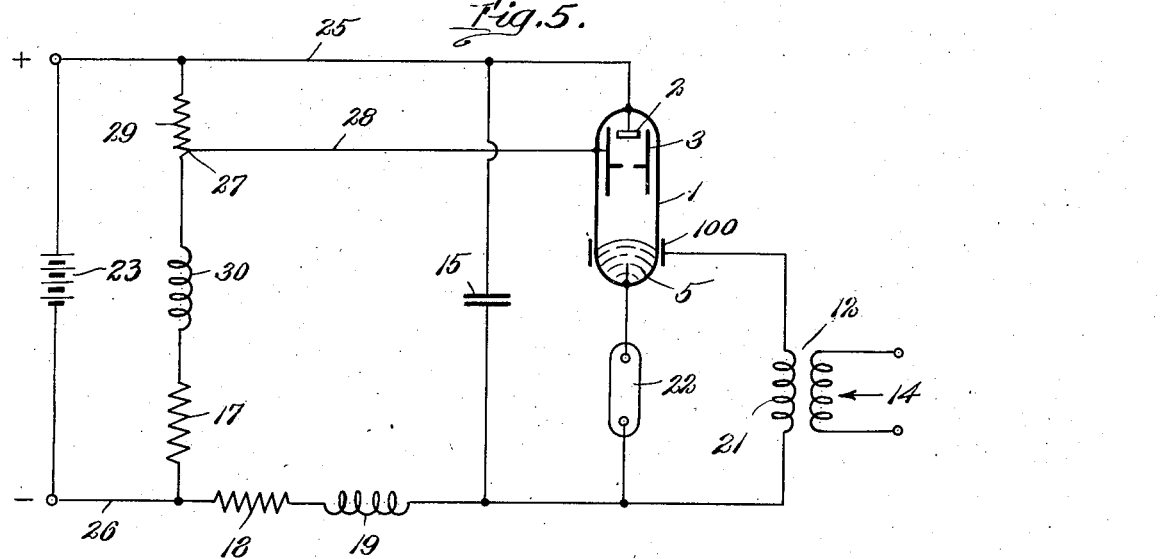
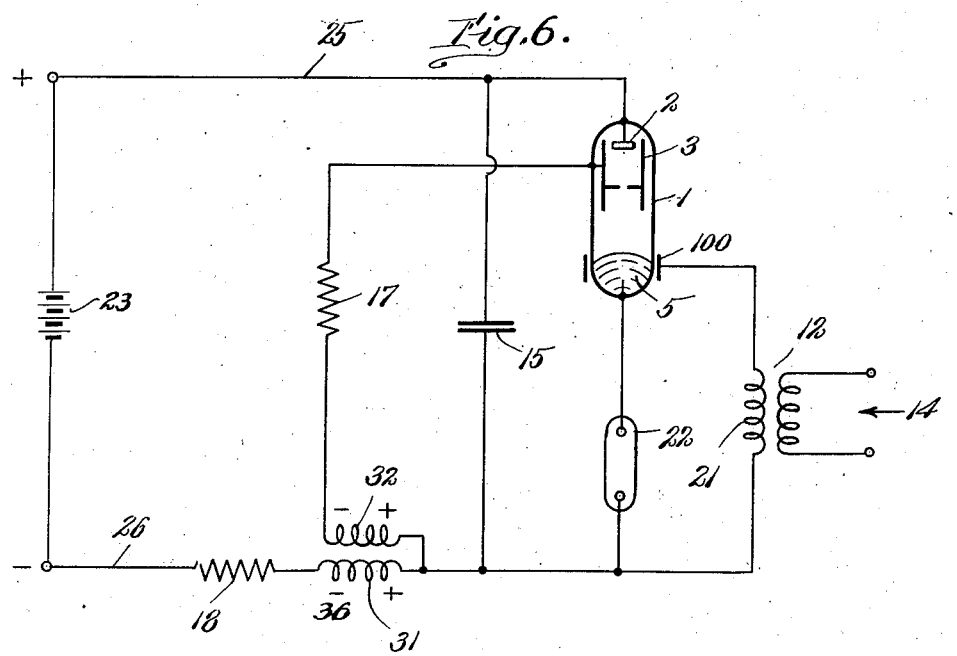
Inventors.
HAROLD E. EDGERTON
KENNETH J. GERMESHAUSEN
by David Rines
Atty.

Patented Jan. 6, 1942

2,269,338

UNITED STATES PATENT OFFICE 2,269,338

FLASH-PRODUCING SYSTEM

Harold Eugene Edgerton, Belmont, and Kenneth Joseph Germeshausen, Cambridge, Mass.

Application September 27, 1939, Serial No. 296,746

17 Claims. (Cl. 176—13)

The present invention relates to flash-producing systems, and more particularly to grid-controlled rectifier systems. From a more limited aspect, the invention relates to rectifier systems of the above-described character provided with rectifier tubes having arc-starter electrode elements.

An object of the present invention is to provide a new and improved rectifier system of the above-described character.

Another object is to provide a new and improved electric system that shall operate accurately and reliably at a desired predetermined time in the cycle.

A further object is to provide a new and improved stroboscope for operation at high frequency.

A further object is to provide a system having an arc-starter tube with rapid deionization characteristics, such as is needed in a high-frequency inverter circuit.

Other and further objects will be explained hereinafter and will be particularly pointed out in the appended claims.

The invention will now be described in connection with the accompanying drawings, in which Fig. 1 is a diagrammatic view of a rectifier tube that may be embodied in the rectifier system of the present invention; Figs. 2 to 4 are views of modified tubes; Fig. 5 is a circuit diagram in accordance with the present invention showing the use of the said tube in a series circuit that is useful for producing stroboscopic light of high frequency and high intensity; and Fig. 6 is a circuit diagram of a further modification.

The before-described tube may be of the gas-filled type, such as a thyratron, a grid-glow tube, or an ignitron. It is illustrated as embodied, however, in a mercury-arc rectifier tube 1, shown provided with a liquid-pool mercury cathode 5, an anode 2, and a control electrode adjacent to the anode. In Fig. 1, the control electrode is illustrated as a shielding grid electrode 3 surrounding the anode 2 and provided with an opening or openings 7 restricting the arc in its passage through the grid structure to the mercury cathode 5. Except for the opening or openings 7, the anode is shielded by the grid 3 from the cathode 5. The anode 2 and the grid 3 may be constituted of carbon or graphite, which does not amalgamate with mercury.

The control electrode 3 may be employed in connection with an external-band arc-starter control electrode 100 for starting the cathode spot at the junction of the mercury 5 and the wall of the tube 1. The cathode spot will then be formed when a suddenly applied potential is applied to the band 100, as described more fully in a copending application, Serial No. 610,045, filed May 9, 1932, by Harold E. Edgerton, which matured, on December 5, 1939, into Letters Patent 2,181,879. The arc-starting electrode 100 may be termed a control electrode, since it controls the starting of an arc at the cathode 5. A suddenly applied negative potential applied to the grid 3 may, however, suddenly present the arc from any longer reaching to the anode.

The said critical value of arc-stopping potential may depend upon the tube construction; in general, a small opening or openings 7 in the grid 3 will require less hold-off voltage than a larger such opening or openings. The control of the instant of stopping of the arc may always be made a function of the potentials upon the two control electrodes 3 and 100 to cause the tube to become deionized at the proper moment.

The tube 1 may be used in circuits as a rectifier tube with two types of control: first, through voltages impressed on the arc-starter electrode 100, and secondly through voltages impressed on the grid electrode 3. Both electrodes must be energized simultaneously in order for the current flow through the tube 1 to cease. It is a characteristic of arc tubes that the current continues to flow until the anode current is interrupted. The sudden application of a negative voltage upon a grid such as the grid 3 will, however, extinguish the arc.

In Letters Patent 2,205,248, issued June 18, 1940, a tube embodying the present invention is described in connection with a method of starting a synchronous motor. The tube is useful in other control circuits also, as in circuits, like high-speed motion-picture stroboscopic lighting sources, that require rapid deionization. A stroboscopic lamp 22, for example, is illustrated in Figs. 5 and 6, but other load circuits may be employed.

The starting band 100 may be replaced by an internal electrode. The tube of Fig. 2 is identical to that of Fig. 1, except that the arc is started by means of a high-resistance igniter 101. The operation of the grid 3 is the same irrespective of the type of starting electrode employed.

In Fig. 3, a grid 13 is shown external to the tube 1, on the outside of the glass thereof, instead of the internal grid 3 of Figs. 1 and 2.

Though the external grid 13 is used in the same manner as the internal grid 3, it has the additional advantage that it is effective to prevent the arc from starting when subjected to a negative potential. A shield grid or guard ring 4 is sometimes useful to reduce or prevent excessive capacity coupling between the starting band 100 and the external grid 13. The grid 4 is useful also for tubes with internal grids, such as the grid 3 illustrated in Figs. 1, 2 and 4.

An electromagnet 6 may be employed, as shown in Fig. 4, the magnetic field of which may be employed to prevent the arc from forming to the anode. Control of the magnet 6 may be obtained at will, usually by energizing the magnet 6 through the medium of a coil of wire (not shown).

Pulses or surges of current for starting the tube 1 are introduced through the low-impedance primary winding 14 of a step-up transformer 12 to the secondary winding 21 of which are connected the cathode 5 and the arc-starting band 100 in a definite phase relationship to the applied voltage.

A condenser 15 is connected by conductors 25 and 26 to a source of direct current, such as a battery 23, through an impedance, which may comprise a resistor 18 and an inductor 19. The condenser 15 is connected in series with the anode 2, the cathode 5 and the stroboscope lamp 22, in order to deliver energy suddenly into the lamp 22 through the tube 1. Since the battery 23 is a source of direct current, there would be a tendency for the current through the tube to continue after the initiation of the rapid current pulse through the tube. In order to extinguish the tube immediately after the initiation of this rapid electrical-transient pulse, therefore, the potential of the grid 3 is immediately rendered highly negative with respect to the cathode 5. This negative potential, which is provided by the drop across the charging resistor 18 and by the relative values of the resistance of the resistors 29 and 17, provides a negative fence around the electrode which is very effective in immediately deionizing the tube 1. The electrode 3 thus serves as a deionization electrode promptly upon the initiation of the electrical transient through the discharge tube 1.

In Fig. 5, the grid is shown connected by a conductor 28 to an intermediate point 27 of an impedance connected across the source 23, which impedance may comprise an inductor 30, a resistor 17 and a resistor 29. The current pulse into the primary winding 14 applies the starting surge to the band 100 for starting the tube 1.

As an alternative method of connection, in which the electrode 3 is likewise connected to the cathode to render it negative with respect to the cathode, the circuit for applying a suitable voltage to the deionizing grid 3 may be charged from a transformer 36, as illustrated in Fig. 6. The transformer 36, which replaces the inductor 19 of Fig. 5, is shown provided with a primary winding 31 in series with the resistor 18 and a secondary winding 32 in series with the resistor 17 connected to the grid 3.

In the circuits of both Figs. 5 and 6, a negative potential is automatically applied to the deionization grid at the exact moment that it is desired to extinguish the flash.

The circuits shown in Figs. 5 and 6 are inverter circuits of the driven type. The lamp 22 is the load and can be any other type of load either with or without transformer coupling.

Though other types of load may thus be employed, however, it will be observed that inherently-low-voltage-starting loads may be connected either on the anode side of the tube 1 or the cathode side. Inherently high-voltage-starting loads, or loads requiring a voltage relatively high compared to the voltage of the source 23 to establish substantial conduction therethrough, however, find particular use when connected on the cathode side, as illustrated, with the secondary winding 21 of the transformer 12 connected across the load, and to the starting electrode 100. The normally non-conducting gaseous-discharge tube 22, for example, is an inherently high-voltage-starting load; the application of a voltage high compared to the voltage of the source 23 is required to render it conducting. This relatively high voltage is produced by means of the transformer 12 and the capacity coupling between the starting electrode 100 and the cathode 5.

The reactance of the primary winding 31 of the transformer 36 is used in the circuit of Fig. 6 for the purpose of coupling the external load to the inverter. Both the charging circuit for the condenser 15 and the discharge circuit for the same may be oscillatory or non-oscillatory as required for desired operation.

The inverter becomes a self-operated one if some of the output is connected back into the input in the proper phase.

The input circuit to the arc-starting grid may be supplied with energy by gas-filled grid-controlled tubes, as described in the said application, Serial No. 610,045, and the said Letters Patent 2,181,879. The tubes described herein are equally effective in polyphase rectifier and inverter circuits as in the single-phase circuits shown. Further modifications, too, will occur to persons skilled in the art, and all such are considered to fall within the spirit and scope of the invention as defined in the appended claims.

What is claimed is:

1. An electric system having, in combination, a normally non-conducting gaseous-discharge device having a cathode, means for connecting the device to a source of energy, the device having a normally unenergized starting electrode for producing when energized a source of electrons at the cathode, thereby to render the device conducting to effect a discharge from the source through the device, means for energizing the starting electrode, the device having also a control electrode, an impedance connected across the source, and means for connecting the control electrode to an intermediate point of the impedance to deionize the gaseous-discharge device immediately after the occurrence of the said discharge.

2. An electric system having, in combination, a normally non-conducting gaseous-discharge device having a cathode, means for connecting the device to a source of energy, the device having a normally unenergized starting electrode for producing when energized a source of electrons at the cathode, thereby to render the device conducting to effect a discharge from the source through the device, means for energizing the starting electrode, the device having also a control electrode, a transformer having a primary winding connected to the source and a secondary winding, and means for connecting the secondary winding to the control electrode to deionize the gaseous-discharge device immediately after the occurrence of the said discharge.

3. A flash-producing system having, in combination, a source of electric energy, a condenser connected with the source so as to be charged from the source, a normally non-conducting gaseous-discharge device, a flash-producing tube, means for connecting the device and the tube to the condenser, the device having a cathode at which a source of electrons may be produced to render the device conducting to effect a discharge from the condenser through the device, thereby to produce a flash in the flash-producing tube, the device having also a normally unenergized means for producing the said source of electrons when energized, means for energizing the normally unenergized means, and means for deionizing the gaseous-discharge device immediately after the occurrence of said discharge.

4. A stroboscope having, in combination, a source of electric energy, a condenser connected with the source so as to be charged from the source, a gaseous-discharge device, a stroboscopic tube, means for connecting the device and the tube to the condenser, the device having a cathode at which a source of electrons may be produced to render the device conducting to effect a discharge from the condenser through the device, thereby to produce a flash in the stroboscopic tube, the device having also a normally unenergized starting electrode for producing the said source of electrons when energized, means for energizing the starting electrode, the device having also a control electrode, and means operable when the normally unenergized means is energized for applying to the control electrode a potential momentarily negative with respect to the cathode immediately after the condenser discharge to deionize the gaseous-discharge device.

5. A stroboscope having, in combination, a source of electric energy, a condenser connected with the source so as to be charged from the source, a gaseous-discharge device having a cathode, an anode, a control electrode and a dionization electrode, a stroboscopic tube connected in circuit with the gaseous-discharge device, means for discharging the condenser through the gaseous-discharge device between the cathode and the anode to produce a flash in the stroboscopic tube, and means operable immediately after the condenser discharge for applying a momentary negative potential to the dionization electrode.

6. An electric system having, in combination, a gaseous-discharge tube provided with a cathode at which a cathode spot may be formed, an anode, and an arc-starting element, a source of energy having two terminals, means for connecting one of the terminals to the anode, a load requiring a voltage relatively high compared to the voltage of the source to establish substantial conduction therethrough and having two terminals, means for connecting one of the load terminals to the cathode and the other load terminal to the other source terminal, a transformer having a primary winding and a secondary winding, and means for connecting the secondary winding to the starting element and to the said other load terminal.

7. An electric system having, in combination, a gaseous-discharge tube provided with a cathode at which a cathode spot may be formed, an anode, and an arc-starting element, a source of energy having two terminals, means for connecting one of the terminals to the anode, a load comprising a normally non-conducting gaseous-discharge device having two terminals and that they may be rendered conducting by the application across its said two terminals of a potential that is high relative to the potential of the source, means for connecting one of the load terminals to the cathode and the other load terminal to the other source terminal, and means for applying the said relatively high potential to the starting element and the said other load terminal.

8. An electric system having, in combination, a normally non-conducting gaseous-discharge device provided with a cathode at which a cathode spot may be formed, an anode, and an arc-starting element for producing the cathode spot to render the device conducting to effect a discharge through the device, a source of energy having two terminals, means for connecting one of the terminals to the anode, a load comprising a normally non-conducting gaseous-discharge device having two terminals and that may be rendered conducting by the application across its said two terminals of a potential that is high relative to the potential of the source, means for connecting one of the load terminals to the cathode and the other load terminal to the other source terminal, a transformer having a primary winding and a secondary winding, means for connecting the secondary winding to the starting element and to the said other load terminal, and means for deionizing the first-named gaseous-discharge device immediately after the occurrence of the said discharge therethrough.

9. An electric system having, in combination, a source of electric energy, a condenser connected with the source so as to be charged from the source, two gaseous-discharge devices, means for connecting the devices to the condenser, one of the devices having a cathode, an anode and two control electrodes, means for applying a potential to one of the control electrodes to initiate a discharge from the condenser through the said one device between the cathode and the anode, thereby to produce a discharge in the other device, and means for applying to the other control electrode a potential momentarily negative with respect to the cathode immediately after the condenser discharge to deionize the said one device.

10. A flash-producer having, in combination, a source of electric energy having positive and negative terminals, a condenser connected with the source so as to be charged from the source, a gaseous-discharge tube provided with two main electrodes, namely, a cathode and an anode and also with two control electrodes, means connecting the condenser in series with the anode and the cathode, an impedance having two terminals, means connecting one of the impedance terminals to the negative terminal of the source, means connecting the other impedance terminal to the connection between the condenser and the cathode, means connected with one of the control electrodes for initiating the discharge through the tube, an impedance connected across the source, and means connecting the other control electrode to an intermediate point of the second-named impedance to deionize the gaseous-discharge device immediately after the occurrence of the said discharge.

11. An electric system having, in combination, a normally non-conducting gaseous-discharge device having a cathode and a control electrode, means for connecting the device to a source of direct-current energy, the device having a normally unenergized starting electrode for producing when energized a source of electrons at the cathode, thereby to render the device conducting to effect a discharge from the source through the device, means for energizing the starting electrode, and means operable at a time when the starting electrode is energized to render the control electrode negative with respect to the cathode to stop the said discharge.

12. An electric system having, in combination, a source of electric energy, a condenser connected with the source so as to be charged from the source, a transformer having a primary winding and a secondary winding, a normally non-conducting gaseous-discharge device having two main electrodes, namely, a cathode and an anode, and also with two control electrodes, means connecting the condenser in series with the anode and the cathode, means connecting the secondary winding to one of the control electrodes and one of the main electrodes, means connected to one of the control electrodes for effecting a discharge of the condenser through the device between the cathode and the anode, and means for connecting the other control electrode to stop the said discharge.

13. An electric system having, in combination, a normally non-conducting gaseous-discharge device having a cathode, an anode, a control electrode and a normally unenergized starting electrode for producing when energized a source of electrons at the cathode, means for connecting the anode and the cathode to a source of energy to render the device conducting to effect a discharge from the source through the device between the cathode and the anode when the starting electrode is energized, means for energizing the starting electrode, and means for connecting the control electrode to the cathode to apply a negative voltage to the control electrode to stop the said discharge.

14. An electric system having, in combination, a normally non-conducting gaseous-discharge device provided with a cathode at which a cathode spot may be formed, an anode, a normally unenergized arc-starting element and a control electrode, a source of energy having two terminals, means for connecting one of the terminals to the anode, a load requiring a voltage relatively high compared to the voltage of the source to establish substantial conduction therethrough and having two terminals, means for connecting one of the load terminals to the cathode and the other load terminal to the other source terminal, a transformer having a primary winding and a secondary winding, means for connecting the secondary winding to the starting element and to the said other load terminal to energize the starting element, thereby to produce a cathode spot at the cathode in order to effect a discharge from the source through the device between the cathode and the anode, and means connected to the control electrode to stop the discharge.

15. An electric system having, in combination, a normally non-conducting gaseous-discharge device provided with a cathode at which a cathode spot may be formed, an anode, a normally unenergized arc-starting element and a control electrode, a source of energy having two terminals, means for connecting one of the terminals to the anode, a load comprising a normally non-conducting gaseous-discharge device having two terminals and that may be rendered conducting by the application across its said two terminals of a potential that is high relative to the potential of the source, means for connecting one of the load terminals to the cathode and the other load terminal to the other source terminal, means for applying the said relatively high potential to the starting element and the said other load terminal to energize the starting element, thereby to produce a cathode spot at the cathode in order to effect a discharge from the source through the device between the cathode and the anode, and means connected to the control electrode to stop the discharge.

16. An electric system having, in combination, a normally non-conducting gaseous-discharge device provided with a cathode at which a cathode spot may be formed, an anode, a normally unenergized arc-starting element for producing the cathode spot to render the device conducting to effect a discharge through the device, and a control electrode, a source of energy having two terminals, means for connecting one of the terminals to the anode, a load comprising a normally non-conducting gaseous-discharge device having two terminals and that may be rendered conducting by the application across its said two terminals of a potential that is high relative to the potential of the source, means for connecting one of the load terminals to the cathode and the other load terminal to the other source terminal, a transformer having a primary winding and a secondary, means for connecting the secondary winding to the starting element and to the said other load terminal to energize the starting element, thereby to produce a cathode spot at the cathode in order to effect a discharge from the source through the device between the cathode and the anode, means for deionizing the first-named gaseous-discharge device immediately after the occurrence of the said discharge therethrough, and means connected to the control electrode to stop the discharge.

17. A flash-producing system having, in combination, a normally non-conducting gaseous-discharge device having an anode, a cathode and a control electrode, means for connecting the anode and the cathode to a source of direct-current energy, the device having a normally unenergized starting electrode for producing when energized a source of electrons at the cathode, thereby to render the device conducting to effect a discharge from the source through the device between the cathode and the anode, means for energizing the starting electrode, a flash-producing tube, means for producing a flash through the tube upon the occurrence of the said discharge, and means operable at a time when the starting electrode is energized to render the control electrode negative with respect to the cathode to stop the said discharge, thereby to extinguish the discharge.

HAROLD E. EDGERTON.
KENNETH J. GERMESHAUSEN.